: 2,982,696
Patented May 2, 1961

2,982,696

ION-EXCHANGE PROCEDURES FOR THE PURIFICATION OF PENICILLINASE

Bruno Puetzer, White Plains, and Armando Boschetti, Massapequa, N.Y., assignors to Schenley Industries, Inc., New York, N.Y., a corporation of Delaware No Drawing. Filed May 1, 1959, Ser. No. 810,215

5 Claims. (Cl. 195—66)

This invention relates, in general, to an improved process for the recovery and purification of the bacterial enzymatic product penicillinase. More particularly, the invention involves the provision of a unique process whereby a relatively crude, highly-pigmented penicillinase product may be totally decolorized and purified to an extremely high degree through the application of selective ion-exchange phenomena and use of a penicillinase-selective eluant which is capable of eluting substantially quantitative yields of the enzyme to the virtual exclusion of residual impurities present on the resin exchange column.

Heretofore, the enzyme penicillinase which finds utility in deactivating penicillins both in vitro for the sterility testing and chemical assaying of penicillin-containing products, and in vivo for the treatment of untoward reactions to penicillins, has been purified from its fermentation broths principally by the application of combined solvent and salt-fractionation techniques. A process of this type has been described and claimed in copending application Serial No. 662,000, filed by Maurice Rosenblatt on May 28, 1957. While these procedures have provided a product of suitable purity for both in vitro and in vivo use, ultimate purity of the enzyme has not been achieved, as witnessed by the fact that present commercial products intended for parenteral administration in humans are highly pigmented. The probable reason for the relative impurity of the enzyme as obtained heretofore by fractionation procedures is that various proteins of similar general characteristics are present in the crude solutions and are not readily removed by the purification measures employed. In addition, various natural coloring agents are also present within the crude concentrates and are carried over in whole or in part into the purified fractions.

The present invention is based on our discovery that ultra-pure, decolorized penicillinase can be obtained by adsorption of the enzyme onto a specially prepared cationic exchange resin, followed by washing and eventual elution of the enzyme from the exchange column under controlled conditions as specified hereinafter. The process of the invention is capable of effecting a reduction in protein content from an initial concentration of about 2.5 milligrams to below 0.33 milligram per million units of enzyme activity (a unit of penicillinase being that amount which effects inactivation of $10^{-7}$ moles of penicillin—59.3 Oxford units of sodium benzylpenicillin—per hour at 25° C. and pH 7.0; see Levy, G. B., Nature 166, 740, 1950), plus effecting substantially total removal of undesirable coloring agents. Thus, assuming that one starts with a penicillinase solution having a purity of approximately 400,000 units of enzyme activity per milligram of protein, the maximum purity obtainable in accordance with the fractionation technique of the aforementioned copending application, the process of our invention is capable of providing a final product having a purity of the order of 3,000,000 units of enzyme activity per milligram of protein.

The preferred exchange resins utilized in practicing our process consist of either the sodium or ammonium forms, buffered at pH 5.5, of a normally weak acid cation-exchange resin consisting of a cross-linked copolymer of methacrylic acid and divinyl benzene, containing between 4 and 10 mol percent of divinyl benzene. A suitable resin of this type is that marketed under the trade name "IRC-50." In actual practice, we find that the sodium form of this resin is somewhat superior to the ammonium form, and, hence, we prefer to employ the resin in its sodium form. The selective eluant utilized in the process of the invention consists of an aqueous solution of sodium citrate of approximately ten percent concentration by weight. We have found that the penicillinase is extremely stable in the presence of this eluant, and that it is capable of returning almost quantitative yields of the enzyme from the exchange column without eluating any appreciable amount of residual impurities contained within the column.

A complete process of the invention may be summarized by the following steps:

(1) Adsorption of penicillinase onto the buffered ion-exchange resin IRC-50 from a relatively crude solution containing the enzyme together with protein impurities and various coloring agents derived from the fermentation cycle, and ammonium sulfate carried over from preliminary fractionation recovery procedures;

(2) Washing of the penicillinase-loaded resin to remove impurities;

(3) Elution of the purified penicillinase from the exchange resin by use of the 10% solution of sodium citrate;

(4) Dialysis of the resulting protein solution to remove or reduce the concentration of sodium citrate therein;

(5) Addition of salts for isotonicity adjustment, and sterilization of the protein solution by filtration through ultra-fine porosity sintered glass;

(6) Dispensing of the sterile purified protein solution into single dose vials; and (7) Lyophilization in situ of the packaged product.

It is believed that our invention may be best understood by reference to the following specific example illustrating the application of the foregoing principles and procedures to the purification of a crude solution of penicillinase:

*Example*

A series of Pyrex glass columns, measuring 40 millimeters in diameter by 500 millimeters in length, are fitted with suitable flow-control elements, and each column is charged with 900 grams of the cation-exchange resin IRC-50 in the sodium form. The resin in each column has been previously buffered at pH 5.5 by means of 1 molar citrate buffer of pH 5.5. The resin is flushed with 0.5 molor citrate buffer at pH 5.5.

A solution of crude penicillinase is prepared at an approximate concentration of 4,000,000 units per cubic centimeter by dissolving in pyrogen-free water. This solution contains approximately forty to sixty milligrams of ammonium sulfate per cubic centimeter which is carried over from fractionation procedures employed for recovery of the enzyme from the fermentation broth. The pH of the enzyme solution is approximately 6.

Two liters of the foregoing penicillinase solution, containing a total of 8 billion units of the enzyme, are passed downwardly over the resin bed at a flow rate of 15 cubic centimeters per minute. In actual practice, one 900 gram bed of the exchange resin, i.e., one column, will adsorb approximately 5.5 billion units of the enzyme.

Rich effluents are passed through a second column to remove the balance of the enzyme from the solution. The pH of the effluents will be between 4.8 and 5.5.

The resin bed is next washed with pyrogen-free water, at a downward flow of 15 cubic centimeters per minute until the water effluent is returned essentially colorless and free of organic and inorganic nitrogen, as determined by digestion of a sample and subsequent nesslerization. The bed is then washed in the same manner with a 0.5% solution of sodium citrate until the washes are again returned free of nitrogen as determined in the same manner. In general, the washing procedures will require approximately 10 liters of water followed by five liters of 0.5% sodium citrate.

The columns are next eluted free of the enzyme by flowing downwardly therethrough, a 10% solution of sodium citrate at a flow rate of approximately 15 cubic centimeters per minute until the eluate contains less than 200,000 units of enzyme per cubic centimeter. The fractions are collected and each fraction is assayed for potency and protein content. All fractions containing a maximum of 0.33 milligram of protein per million units of enzyme are combined for dialysis.

The combined protein solution as collected above is dialyzed against distilled water until the sodium citrate content is approximately three milligrams per million units. We deliberately avoid dialyzing the solution free of sodium citrate, since we have established that the presence of a small amount of sodium citrate functions to stabilize the enzyme.

At this point, inert lyophilization stabilizers may be added to the enzyme solution.

The dialyzed protein solution is then compounded to contain sufficient sodium chloride for isotonicity purposes, and is sterile-filtered through ultra-fine sintered glass. The sterile solution is then aseptically dispensed into single dose glass vials at a fill of approximately 840,000 units per vial and lyophilized. The vials are sealed and may be subsequently reconstituted with sterile water for injection at the time of use.

The following tabulated data summarizes the foregoing procedure on a single column basis:

| | |
|---|---|
| Ion exchange resin used | IRC-50 at pH 5.5. |
| Amount of resin | 900 grams. |
| Resin volume | 40 mm. x 500 mm. |
| Total activity of starting solution | 8.0 billion units. |
| Concentration of starting solution | 4.0 million units/cc. |
| Flow rate of solution through resin | 15 minutes per cc. |
| Amount of enzyme adsorbed | 5.3 billion units. |
| Concentration of eluate | 2.0 to 6.0 million per cc. |
| Amount of enzyme eluted | 4.6 billion units. |
| Starting purity of enzyme | 400,000 units per mg. of protein. |
| Purity of recovered enzyme | 3.0 million units per mg. of protein. |

Having thus described the subject matter of our invention, what it is desired to secure by Letters Patent is:

1. Process for recovering penicillinase from relatively crude solutions of the enzyme that comprises, contacting a relatively impure solution of penicillinase with the cation exchange resin composed of a cross-linked copolymer of methacrylic acid and divinyl benzene, containing between 4 and 10 mol percent of divinyl benzene buffered to approximately pH 5.5 to effect selective adsorption of penicillinase onto said exchange resin, eluting the adsorbed penicillinase from said exchange resin by means of an aqueous solution containing approximately 10% by weight of sodium citrate, and dialyzing said sodium citrate-penicillinase solution to provide a purified solution of the enzyme.

2. Process for recovering penicillinase from relatively crude solution of the enzyme that comprises, contacting a relatively impure solution of penicillinase with the cation exchange resin composed of a cross-linked copolymer of methacrylic acid and divinyl benzene, containing between 4 and 10 mol percent of divinyl benzene in the sodium form and buffered to pH 5.5 to effect adsorption of penicillinase onto said exchange resin, washing the penicillinase-containing exchange resin with water to remove impurities therefrom, eluting the adsorbed penicillinase from said exchange resin with an aqueous solution containing approximately 10% by weight of sodium citrate, and dialyzing the resulting sodium citrate-penicillinase solution to provide a purified solution of the enzyme.

3. The process as claimed in claim 2, wherein said dialysis is conducted to provide approximately three milligrams per million units of penicillinase of residual sodium citrate within said solution.

4. The process as claimed in claim 2, wherein said purified solution of penicillinase is adjusted to an isotonic concentration by the addition of sodium chloride, and the resulting solution is lyophilized for storage stability.

5. Process for recovering highly-purified penicillinase from a relatively crude solution of the enzyme containing protein impurities and coloring matter that comprises, contacting said relatively crude solution with the cation exchange resin composed of a cross-linked copolymer of methacrylic acid and divinyl benzene, containing between 4 and 10 mol percent of divinyl benzene in its sodium form and buffered to pH 5.5 to effect the selective adsorption of penicillinase onto said exchange resin, washing said penicillinase-containing exchange resin with water and a 0.5% by weight solution of sodium citrate to remove impurities entrained thereon, eluting the adsorbed penicillinase from said exchange resin with an aqueous solution containing about 10% by weight of sodium citrate, and dialyzing the resulting sodium citrate-penicillinase solution to a residual sodium citrate content of approximately three milligrams per million units of penicillinase contained therein.

References Cited in the file of this patent
UNITED STATES PATENTS 2,886,489     Grant et al. _____ May 12, 1959

OTHER REFERENCES

Biochemical Journal, vol 62, pages 391-394, 1956, Cambridge University Press, New York, QP501B47.